Nov. 24, 1964                L. J. WARE                3,158,679
PORTABLE FOLDING UTILITY-CONNECTION TOWER
Filed Oct. 5, 1962                              2 Sheets-Sheet 1
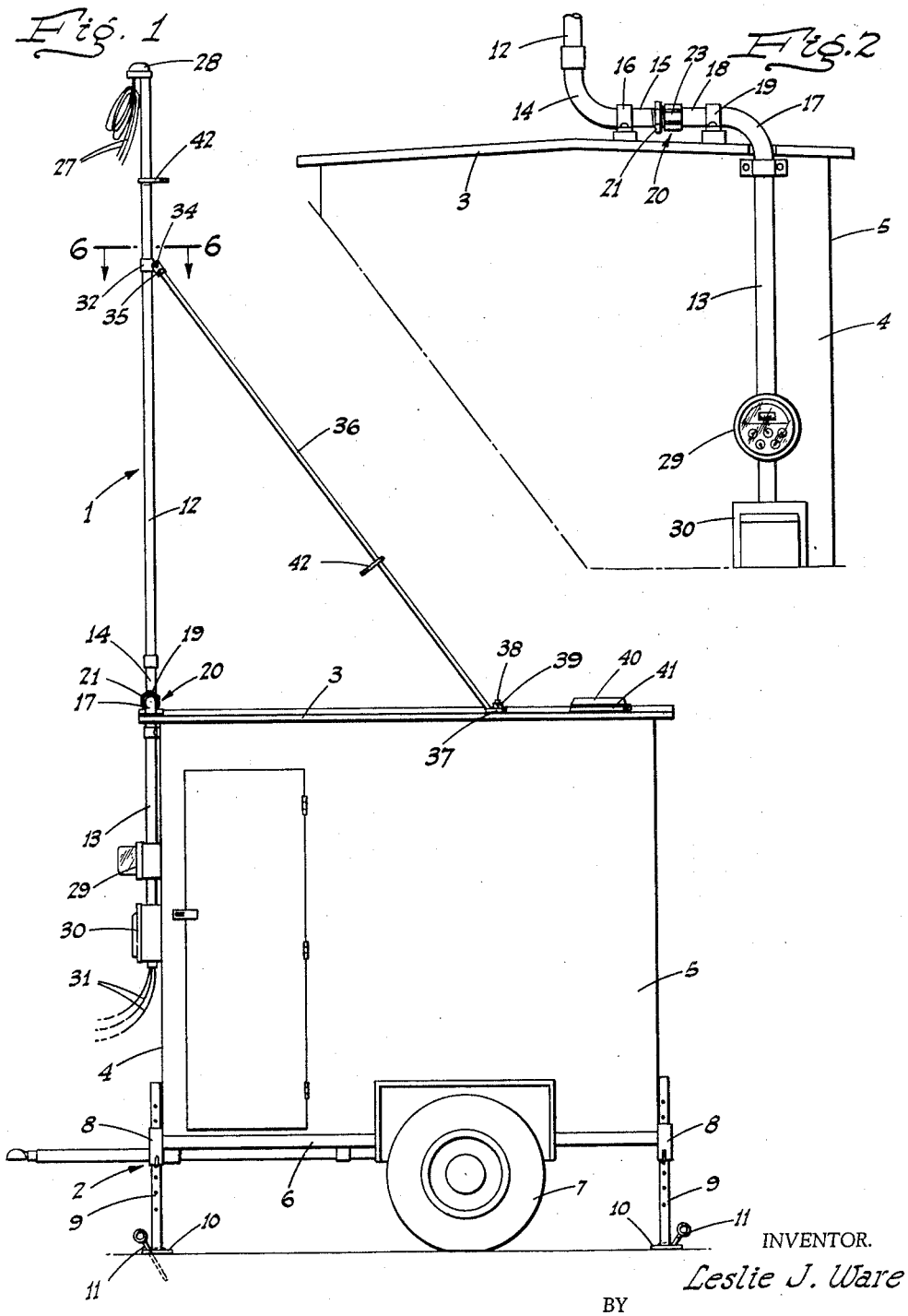
INVENTOR.
Leslie J. Ware
BY
Webster & Webster
ATTYS.

Nov. 24, 1964 　　　L. J. WARE　　　3,158,679
PORTABLE FOLDING UTILITY-CONNECTION TOWER
Filed Oct. 5, 1962　　　　　　　　　　　　　2 Sheets-Sheet 2
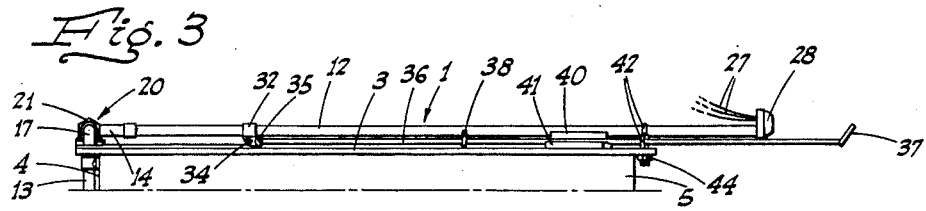
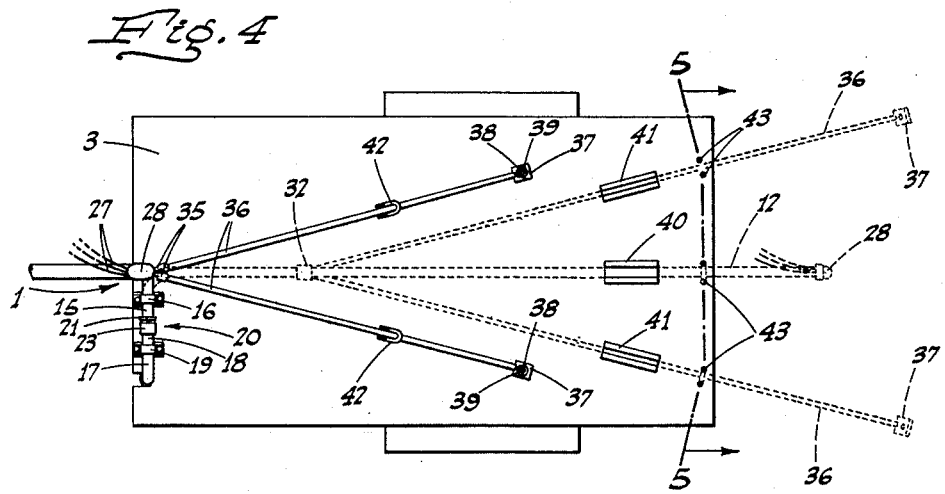
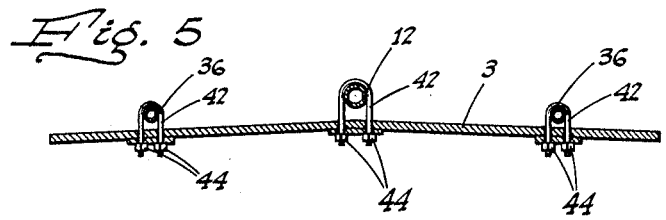
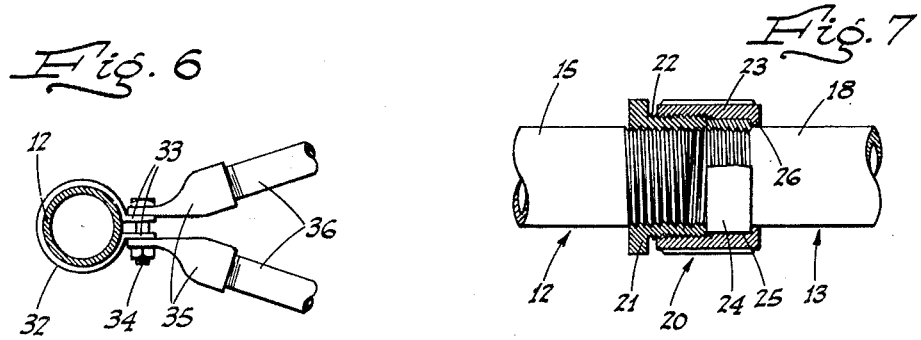

United States Patent Office 3,158,679
Patented Nov. 24, 1964

3,158,679
PORTABLE FOLDING UTILITY-CONNECTION TOWER
Leslie J. Ware, San Jose, Calif.
(1450 Dell Ave., Campbell, Calif.)
Filed Oct. 5, 1962, Ser. No. 228,717
8 Claims. (Cl. 174—1)

This invention relates to what may be considered as being contractors or builders equipment, and which equipment includes electrically operated tools or implements necessary for use on buildings or the like being constructed.

Frequently such constructional operations are carried out at locations where no convenience outlets are handy and available for connection to the electrical tools desired to be used by the contractor. In such cases, it is necessary to make arrangements with the local utility company to provide current, at ground level, from an adjacent line pole, for whatever length of time may be desired by the contractor. This is an operation which consumes considerable time, and for various reasons is not looked on with favor by the utility company.

The major object of this invention therefore is to provide a portable tower adapted to be moved to a point convenient to the job and adjacent a line pole, and provided with wires projecting from the top of the tower and which may be easily connected (by a lineman) to the circuit cables of the line pole, and which wires are connected to a meter unit and a switch box mounted in fixed connection with the tower at a point convenient for ground observation and manipulation, and from which switch box other wires project for connection to the tools or implements to be operated.

The tower is mounted on a trailer adapted to be towed to the location of the job, and to be then disconnected from the towing vehicle. It is another object of the invention to provide means for anchoring the trailer to the ground and in a fixed location before the hook-up with the pole cables is made, as the utility companies and State inspection departments require, so that there will be no danger of the connected wires being subsequently strained or pulled loose.

The tower includes a relatively tall upper portion, and guy legs connected thereto and to the trailer to maintain such upper portion in a rigid position when erected, since said portion is of light construction which requires bracing. In connection with this feature, it is a further object of the invention to so mount the upper portion, and the legs, in relation to each other and to the trailer so that said upper portion and the legs may be folded in a quick and easy manner to extend lengthwise onto the trailer when the latter is to be transported from one place to another.

A further object of the invention is to provide a portable folding utility-connection tower which is designed for ease and economy of manufacture.

It is also an object of the invention to provide a practical, reliable, and durable portable folding utility-connection tower, and one which will be exceedingly effective for the purpose for which it is designed.

These objects are accomplished by means of such structure and relative arrangement of parts as will fully appear by a perusal of the following specification and claims.

In the drawings:

FIG. 1 is a side elevation of the trailer-mounted folding utility-connection tower, showing the tower in its erected position.

FIG. 2 is an enlarged fragmentary front end view of the trailer, showing the swivel mounting connection of the tower therewith.

FIG. 3 is a fragmentary side elevation of the trailer, showing the tower thereon in a folded position.

FIG. 4 is a top plan view of the trailer and tower, showing the latter in a raised position; the folded position of the tower being indicated in dotted lines.

FIG. 5 is a fragmentary enlarged cross section on line 5—5 of FIG. 4, with the tower parts in their folded and secured position.

FIG. 6 is an enlarged fragmentary sectional plan taken on line 6—6 of FIG. 1.

FIG. 7 is an enlarged elevation, mainly in section, of the swivel clamping coupling between the folding and stationary portions of the tower.

Referring now more particularly to the drawings, and to the characters of reference marked thereon, the tower 1, hereinafter specifically described, is here shown as being mounted on a trailer 2 in connection with the roof 3 and the forward end wall 4 of the body 5 thereof; said roof being substantially flat and forming a platform. Said body, which may be arranged to serve as a contractor's office, as a tool or parts holding container, or for other purposes, is mounted on a base frame 6. This frame is supported by a pair of wheels, one of which is shown at 7, and at its corners carries vertical sleeves 8 in which legs 9 are slidably and adjustably mounted. Said legs at their lower ends are provided with horizontal pads 10 adapted for ground engagement when the trailer is disconnected from its hauling vehicle. Heavy ground penetrating anchor pins 11 are detachably slidable through the pads, so that the trailer when once set up at the position desired will then be positively prevented from shifting.

The tower 1 comprises an upper tubular portion 12 above the roof 3 and disposed centrally of the width thereof, and a lower tubular portion 13 mainly below said roof and depending vertically adjacent and secured to the end wall 4 to one side of the portion 12, but alined therewith in a transverse plane, as clearly shown in FIG. 1. At its lower end, portion 12 is bent, on top of the roof 3, toward the portion 13, as shown at 14; said bent portion terminating in a short horizontal extension 15 which is threaded at its outer end.

The extension 15, short of said outer end, is turnably supported in a roof-mounted bearing saddle 16. Similarly, the lower tubular portion 13, at its upper end, is formed with a bend 17 which extends toward the extension 15, and terminates in a horizontal extension 18 alined with but terminating short of said extension 15; the outer end of extension 18 being threaded and being held against movement by a roof-mounted clamping collar 19.

As shown particularly in FIG. 7, the extensions 15 and 18 are connected by a coupling, indicated generally at 20. The threaded end of the extension 15 is secured in an embracing collar 21 which is externally threaded, as at 22, and onto which the adjacent tapped end of a rotatable sleeve 23 is adjustably screwed.

A smooth-faced collar 24 is secured on the threaded end of extension 18, and relatively turnably seats in the adjacent smooth-bore portion 25 of the sleeve 23, between the inner end of collar 21 and a radially inwardly projecting shoulder 26 on the adjacent end of said sleeve. By reason of this coupling structure as described, it will be seen that if the extension 15 is held from turning, rotation of the sleeve 23 in a direction to advance the same onto collar 21 will cause said collar, and the extension 15 secured thereto, to be pulled into the sleeve into binding relation with the adjacent end of the collar 24; thus clamping the extension 15 and the upper tubular portion 12 of which said extension is a part, against possible rotative movement.

Circuit wires 27 extend through the tubular portions for the full length thereof, and—at the upper end of the tower—pass out from the same through a conventional fitting 28, leaving a sufficient length of loose wiring outside the tower, as shown in FIG. 1, for ready and temporary connection to the circuit cables of a line pole.

At its lower end, the tubular portion 13 terminates at a conventional meter unit 29 secured against the wall 4 in close association with a fuse and switch box 30; the wires 27 extending to such box and unit, and being permanently connected to the operating parts therein in the customary manner. Other wires 31 lead from the switch box for connection to the electric tools or implements to be operated.

Adjustably slidable on the tubular portion 12 is a split clamping collar 32 having ears 33 projecting rearwardly from the split and through which a clamping bolt 34 passes. This clamping bolt also serves as the pivotal mounting and connection of the upper end fittings 35 of a pair of diverging rigid guy legs 36. At their rear or outer ends the legs are provided with orificed pads 37 which, when the tubular portion 12 is vertical and the collar 32 is in a certain position on the tubular portion, will be horizontally disposed and in position to receive roof-mounted studs 38 therethrough, so that nuts 39 then screwed onto the studs will hold the pads 37, and the guy legs 36, rigidly in place.

After the guy legs are thus disposed, the clamping collar 32 is tightened about the tubular portion 12, so that a rigid structure is then provided. It is then a simple and easy matter for a lineman, when called onto the job, to connect the projecting wires 27 to the circuit cables of the line pole, and to later disconnect the wires after the work at that location has been completed by the contractor. All current consumed in the time between the connection and disconnection of the wires 27 with the line cables will be recorded at the meter unit, so that the proper charge may be assessed against the contractor without any question. All during this time any movement of the trailer such as might possibly strain or tear the wires 27 loose from their cable connections, is prevented by the anchoring pins 11 previously described.

When it is desired to lower the tubular portion 12 for transportation of the trailer, the coupling sleeve 23 and the collar 32 are loosened, and the nuts 39 are removed. This enables the pads 37 to be withdrawn from the studs 30 so that the tubular portion 12 may be swung down onto the roof 3, turning about the coupling 20 as an axis, while at the same time the guy legs 36 are being folded in an upward direction, swinging about the bolt 34 as an axis. With such swinging, the collar 32 is slid down a considerable distance on said tubular portion, so that the legs 36, when lying flat on the roof, will not project an unduly long distance beyond the rear end of the trailer, while at the same time enabling the legs—when in a tower bracing position—to engage the tower well toward the upper end thereof, as is desired in order to provide the most effective bracing action.

When the tubular portion 12 and the legs 36 are disposed in a substantially horizontal position over the roof 3 they seat, adjacent the rear end of the roof, in locating cradles 40 and 41, respectively, secured on the roof, and which cradles prevent lateral sway of the members engaged thereby. To then hold the upper portion and legs against upward movement, they are provided with depending U-bolts 42 which are secured thereon in position to engage matching pairs of holes 43 extending through the rearwardly overhanging portion of the roof 3, so that the U-bolts projecting through such holes are accessible from outside of the trailer body for the placement of nuts 44 on the lower ends of said bolts, as shown in FIG. 5.

It may here be noted that the trailer and tower structure as above described meets the safety requirements of utility companies and State departments, and has been approved for commercial use.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A portable utility-connection structure comprising a supporting vehicle, a tubular tower unit mounted on and upstanding from the vehicle when the tower is in operation, wiring projecting from the upper end of the tower unit for connection to pole-mounted circuit cables and from the lower end of the tower unit for connection to electrical devices, the tower unit comprising upper and lower members, means mounting the lower member rigidly on the vehicle, and means permanently connecting the members at their adjacent ends for folding movement of the upper member downwardly over the vehicle in one direction from a vertical position.

2. A structure, as in claim 1, with means included with said connecting means normally preventing such folding movement of the upper tower member.

3. A portable utility-connection structure comprising a supporting vehicle, a tubular tower unit mounted on and upstanding from the vehicle when the tower is in operation, wiring projecting from the upper end of the tower unit for connection to pole-mounted circuit cables and from the lower end of the tower unit for connection to electrical devices, the tower unit comprising upper and lower members, means mounting the lower member rigidly on the vehicle, means connecting the members at their adjacent ends for folding movement of the upper member downwardly over the vehicle in one direction from a vertical position, rigid guy legs extending downwardly to the vehicle from the upper tower member when the latter is in a vertical position, means connecting the legs at their upper ends to the upper tower member for folding movement of the legs in the same direction as the tower member, and means detachably connecting the legs at their lower ends on the vehicle.

4. A structure, as in claim 3, in which the means connecting the legs to the tower member comprises a clamping collar slidably mounted on said upper tower member, and means transversely pivoting the legs at their upper ends on said collar.

5. A portable utility-connection structure comprising a supporting vehicle, a tubular tower unit mounted on and upstanding from the vehicle when the tower is in operation, wiring projecting from the upper end of the tower unit for connection to pole-mounted circuit cables and from the lower end of the tower unit for connection to electrical devices, the tower unit comprising upper and lower members, the latter being laterally offset from the upper member, a lateral horizontal extension formed on and rigid with the lower end of the upper member, a lateral extension on the upper end of the lower member, said extensions being alined and projecting toward and terminating adjacent each other, a coupling connecting said extensions and arranged to allow of rotation of the first named extension relative to the second named extension, and means included with the coupling to releasably clamp the first named extension against rotation.

6. A structure, as in claim 5, in which the last named means comprises a collar fixed on the end of one extension, said collar being externally threaded, another and smooth-surfaced collar fixed on the end of the other extension, the adjacent ends of the collars engaging each other, and a sleeve turnably mounted on the last named collar and held against axial movement thereon, said sleeve projecting beyond said last named collar and being adjustably threaded onto the first named collar.

7. A portable utility-connection structure comprising a supporting vehicle having a substantially flat top, a tubular wire-enclosing tower unit including an upper member above said top, means mounting the tower member on the vehicle adjacent one end thereof for folding movement onto the top of the vehicle from a vertical position, a rigid guy-leg unit extending downwardly toward the opposite end of the vehicle top from the tower member when the latter is in a vertical position, means detachably connecting the leg unit at its lower end on the vehicle top, and a releasable clamping collar slidably mounted on the tower member and on which collar the leg unit at its upper end is pivoted.

8. A structure, as in claim 7, in which the leg unit comprises a pair of legs diverting laterally from the clamping collar, and cradles fixed on the vehicle top in position to engage a portion of the guy legs when the latter are folded down onto said vehicle top.

References Cited by the Examiner

UNITED STATES PATENTS

| | | | |
|---|---|---|---|
| 708,104 | 9/02 | Warner | 285—282 X |
| 2,262,585 | 11/41 | Irmischer | 285—282 X |
| 2,611,580 | 9/52 | Troche et al. | 189—11 X |
| 2,632,850 | 3/53 | Anderson | 285—62 X |
| 2,715,014 | 8/55 | Barnett et al. | 189—11 X |
| 2,763,709 | 9/56 | Scott | 174—40 |
| 2,961,255 | 11/60 | Trott | 20—2 X |
| 2,977,402 | 3/61 | Parkison | 174—45 |

FOREIGN PATENTS 882,440　7/53　Germany.

JOHN F. BURNS, *Primary Examiner.*

JOHN P. WILDMAN, *Examiner.*